United States Patent

[11] 3,599,718

| [72] | Inventors | Edwin A. Richardson;<br>Robert S. Torrest, both of Houston, Tex. |
|---|---|---|
| [21] | Appl. No. | 835,243 |
| [22] | Filed | June 20, 1969 |
| [45] | Patented | Aug. 17, 1971 |
| [73] | Assignee | Shell Oil Company<br>New York, N.Y. |

[54] ELECTROLESS METAL BONDING OF UNCONSOLIDATED FORMATIONS
5 Claims, No Drawings

[52] U.S. Cl. .................................................. 166/292, 166/300
[51] Int. Cl. .................................................. E21b 33/138
[50] Field of Search .......................................... 166/292, 295, 300; 117/54

[56] References Cited
UNITED STATES PATENTS

| 3,310,111 | 3/1967 | Pavlich et al. ............... | 166/295 |
| 3,393,737 | 7/1968 | Richardson .................. | 166/300 X |
| 3,438,440 | 4/1969 | Richardson .................. | 166/292 |
| 3,438,441 | 4/1969 | Richardson .................. | 166/292 |

Primary Examiner—Ian A. Calvert
Attorneys—George G. Pritzker and J. H. McCarthy

ABSTRACT: A method of consolidating an incompetent or unconsolidated earth formation, over a wide temperature range, by subjecting the formation to an electroless metal-plating process wherein prior to metal binding and consolidating it the formation is activated with an activating colloidal metal forming solution having a pH within the range of from 4 to 5 and containing a viscosity-enhancing material capable of suspending the colloidal particles in solution.

3,599,718

ELECTROLESS METAL BONDING OF UNCONSOLIDATED FORMATIONS

BACKGROUND OF THE INVENTION

In U.S. Pats. Nos. 3,393,737, 3,438,440, 3,438,441 and pending applications Ser. No. 692,726 filed Dec. 27, 1967 which matured as U.S. Pat. No. 3,500,926, and Ser. No. 705,907 filed Feb. 16, 1968 which matured as U.S. Pat. No. 3,500,927, electroless metal-plating techniques are described for consolidating unconsolidated formations, and it is clearly disclosed that the process is generally superior to resin consolidated techniques for consolidating earth formations as described in such papers as J. Pet. Tech. May 1966, p. 545 entitled "Review of Sand Consolidation Experience in Southern Louisiana" J. L. Rike, or J. Pet. Tech. Dec. 1961 paper entitled "Large-Scale Laboratory Investigation of Sand Consolidation Techniques" by W. F. Hoover, or J. Pet. Tech. Dec. 1966, page 1537, or an article entitled "Studies of a New Process to Consolidate Oil Sands With Plastics" by B. R. Treadway or as described in U.S. Pats. Nos. 3,412,7963,419,072, 3,378,071, 3,373,813, 3,310,111, 3,282,338 and the like. In essentially all of these resin consolidation processes for consolidating incompetent formation, rigs are required, curing time is difficult to control, the resin coating or binding material is not resistant to temperature changes encountered in the treated formation or to water stability or the influence of corrosive acids and the like. This results in costly operations of restrictive use and benefit and, therefore, makes the electroless metal consolidation techniques described in the above-mentioned references more attractive since metal-consolidated formation require no rig, the formations thus treated are not affected by temperature changes and are water stable and impart high compressive strength to such metallized and consolidated formations.

From the references on electroless metal-plating processes for consolidation of earth formations the temperature of the formation is an important factor for consideration in making the process successful as evidenced by reference to U.S. Pats. 3,438,440 and 3,438,441.

SUMMARY OF THE INVENTION

It has now been discovered that unconsolidated earth formations can be successfully consolidated into formation having high compressive strength and which are resistant to the action of water and the like by activating said unconsolidated formations, prior to treatment with an electroless metal-plating solution, with an acidic aqueous solution containing a colloidal metal-forming earth activator kept in suspension by means of a viscosity-enhancing agent; said solution having a pH in the range of from 4 to 5.

Thus, in activating a subterranean earth formation to absorb a plating of metal from an electroless metal-plating solution which is displaced through a conduit within a well and into the earth formation, the process is improved by:

1. dissolving in an aqueous solution an earth activator such as a water-soluble salt of a metal that catalyzes electroless metal deposition and a reducing agent capable of releasing the metal from the salt in an aqueous liquid solution that contains sufficient viscosity-enhancing material to form a colloidal suspension of metal released from the salt;
2. buffering the solution by mixing it with a buffering system which is compatible with the solution components and is adjusting to maintain the pH of the solution within the range of from about 4 to 5 while the solution is in contact with ferrous metal and earth formation components; and
3. pumping the buffered solution through a conduit within the well and into the earth formation.

THE EMBODIMENT OF THE INVENTION

A slug of the activator solution is preferably injected into the earth formation prior to the injection of an electroless metal-plating solution. However, the activator solution can be injected along with the electroless metal-plating solution, either as a separate fluid stream or as a component of a mixture of an activator solution and a metal-plating solution. In the latter case, the metal-plating solution is preferably kept in the form of an acidic solution having a pH substantially equaling that of the activator solution; namely between a pH of 4 and 5.

The present invention is based on a discovery that, in an electroless metal-plating of a subterranean earth formation, the pH of the activator solution and the size of the particles of metal it contains may seriously affect the results of the plating process. In order to activate a subterranean earth formation, such as a sand, it is important that the activator solution be acidic, even though alkaline activator solutions are often suitable for the activation of plastics or other nonmetallic materials. In addition, in order to activate a subterranean earth formation, it is important that the activator solution be effective after being exposed to a significant amount of contact with a ferrous metal conduit, such as a conduit within a well. Activator solutions which are too acidic (having a pH lower than 4) cause corrosion problems due to their tendency to dissolve metal from such a conduit and, in addition, tend to become ineffective by the time they are injected into an earth formation.

It has now been discovered that when an activator solution which is pumped through a conduit and injected into a subterranean earth formation contains sufficient viscosity-enhancing material to form a substantially homogeneous colloidal suspension of the metal which is being released by the reducing agent and contains sufficient buffering agent to stabilize its pH within the range of from about 4 to 5, the solution is highly effective when it reaches the earth formation and is noncorrosive to the conduit or equipment handling the solution. Since the components of an activator solution begin to react as soon as they are mixed, they are generally mixed in a field location near a well. With respect to this, the present use of the buffer system to control the pH provides a significant advantage in the attainment of the elected pH. The measuring and testing equipment that is generally available in the field is such that it is often difficult and time consuming to adjust the acid content of a solution until the pH of the solution has become stabilized at a value within a narrow range, such as from 4 to 5. It is unobviously advantageous to simply measure and add the appropriate amounts of buffering system components, such as formic acid and/or sodium formate, in order to provide and maintain a pH within the range of from 4 to 5. Variations in local water pH or the addition of excess hydrazine solution have made activator pH adjustment a difficult and bothersome trial and error job on the well site. It is, therefore, desirable to have a simple buffer system for effective pH control of the activator that should help to simplify solution preparation for field applications.

PREFERRED EMBODIMENT OF THE INVENTION

It has been found that generally when activating unconsolidated earth formations in order to metal bond or consolidate the sand grains into a consolidated mass by means of the electroless metal process of the present invention, the activator solution, particularly for nickel or cobalt or copper plating, will not deposit colloidal metal, e.g., palladium metal on the sand surface, unless the pH of the solution is preferably in the range of from 4.0 to 4.5.

A standard activator solution composition which overcomes previous difficulties is shown in Table 1 for activation tests on a one liter basis for field use as the composition per barrel.

TABLE 1.—COMPOSITION OF ACTIVATOR SOLUTION

|  | 1 liter (for activation test) | 1 barrel |
|---|---|---|
| Water | 960 cc | 40.7 gallons. |
| Gum arabic | 40 cc. of 4 gm./l. solution | 20.6 gms. |
| Hydrazine hydrate (85%) | 1.6 cc | 256 cc. (or 400 cc. of 35% hydrazine). |
| Palladium chloride solution* | 4.0 cc | 636 cc. |
| Omit when buffers are used: | | |
| $NiSO_4 \cdot 6H_2O$ | 10 gms | 3.5 pounds. |
| 90% formic acid or glacial acetic (as needed for pH ≈ 4.4). | ~1 to 2 cc | ~160 to 320 cc. |
| Buffers: | | |
| Formic acid (90%) | 4 cc | 640 cc. |
| Sodium formate | 20 gms | 7 pounds. |
| or: | | |
| Acetic acid (glacial) | 40 cc | 6.4 liters. |
| Sodium acetate | 30 gms | 10.5 pounds. |

*Contains 1.6 gms. $PdCl_2$, 10 cc. conc. HCl, 90 cc. distilled or deionized water.
NOTE: Chemicals must be added to the water in the order listed with complete mixing and dissolving before adding the next chemical.

As shown, about 1 percent by volume of 90 percent formic acid or glacial acetic acid is required to reduce the pH to about 4.4 when buffers are not used. However, for somewhat alkaline water, several times this amount of acid would be required to achieve the desired pH. The solution also has 1 percent by weight of $NiSO_4 \cdot 6H_2O$ added last for clay stabilization. Replacing the nickel sulfate with 2 percent by weight of sodium formate and 0.4 percent by volume of 90 percent formic acid gives effective pH control at 4.2 to 4.3 and the required clay stabilization. (The same effect can be achieved with 3 percent by weight of sodium acetate and 4 percent by volume of glacial acetate acid.)

The solution of a weak acid and its salt such as formic or acetic acids and their alkali metal salts is most effective as a buffer when their concentrations are equal. The pH of a solution containing equal concentrations of acetic acid and sodium acetate would be 4.76, while for the formate system the pH would be 3.76. The nickel sulfate solution can be replaced by 2 percent by weight of a weak acid salt, whereby the pH can be restricted to a range of 4 to 4.5. The buffer compositions cannot be made to give maximum buffer capacity but can be chosen to hold the pH effectively under field conditions. The formate buffer is preferable, since 10 times more acetic acid that formic is required for effective buffering.

With the controlled acidic activator solutions of this invention either basic or acidic electroless metal plating solutions can be used and examples of such solutions are shown in Tables 2 and 3.

TABLE 2. BASIC PLATING SOLUTION

| Component | Quantity per Barrel of Solution |
|---|---|
| $H_2O$ | 35.9 gallons |
| $NiCl_2 \cdot H_2O$ | 13.28 pounds |
| $NaH_2PO_2 \cdot H_2O$ | 15.95 pounds |
| $NH_4Cl$ | 21.9 pounds |
| 30% $NH_3$ | 2.19 gallons |
| Solution density | 1.06 gm./cc. |
| Solution pH | 8.7 |

TABLE 3. ACIDIC PLATING SOLUTIONS

| | Quantity per Barrel of Solution | |
|---|---|---|
| Component | Formate System | Acetate System |
| $NiSO_4 \cdot 6H_2O$ | 29.5 pounds | 29.5 pounds |
| $NaH_2PO_2 \cdot H_2O$ | 42.2 pounds | 42.2 pounds |
| Succinic Acid | 4.6 pounds | 4.6 pounds |
| NaOH (30% Solution) | 0.937 gal. | 0.937 gal. |
| Sodium Formate | 15.77 pounds | |
| Sodium Acetate $3H_2O$ | | 31.6 pounds |
| Water | 36.42 gal. | 34.74 gal. |
| Solution Density | ≈1.15 gm./cc. | ≈1.15 gm./cc. |
| pH Range | 3 to 4 | 4 to 5 |

In carrying out the process of this invention so as to consolidate an earth formation penetrated by a well borehole it is preferred to:
1. optionally preflush the formation with a suitable hydrocarbon and/or alcohol solution;
2. inject into the formation an acidic aqueous solution having a pH 4—4.5 and colloidal forming metal activator and a viscosity enhancing material such as palladium chloride and a natural gum or polymeric material;
3. inject a partial amount of metal-plating solution such as shown in Tables 2 or 3 to partially effect metallization of the formation;
4. backflush the injected solutions 1—3 from the earth formation up the conduit (tubing string) of the well borehole to remove debris from the formation; and
5. inject solution (3) to complete the process and effect completion of consolidation.

If desired, steps (2) and (3) can be combined depending on the type of formation being treated and the temperature conditions of the formation.

The foregoing description of the invention is merely intended to be an explanation thereof. Various changes in the details of the invention may be made within the scope of the appended claims without departing from the spirit of the invention.

We claim as our invention:
1. A method of consolidating an incompetent earth formation penetrated by a well borehole comprising the steps of:
   a. injecting via the borehole and into the incompetent formation an acidic activating solution containing colloidal particles of a metallic earth activator and a viscosity enhancing agent in an amount sufficient to keep the colloidal particles stably dispersed in the solution, said solution having a pH of 4—5;
   b. injecting a portion of an electroless metal-plating solution;
   c. backflushing solutions (a) and (b) so as to remove impurities and debris from the formation;
   d. injecting the balance of the electroless metal-plating solution; and,
   e. maintaining said solution (d) until the formation has been consolidated.
2. The method of claim 1 wherein the metal in the metal-plating solution is nickel and the colloidal metal in the activator solution is palladium and the viscosity-enhancing agent is selected from the group consisting of natural and synthetic gums and polymers.
3. The method of claim 1 wherein the buffering agent is a mixture of formic acid and sodium salt thereof.
4. The method of claim 1 wherein the buffering agent is a mixture of acetic acid and sodium salt thereof.
5. The method of claim 1 wherein the activating solution (a) contains $PdCl_2$ as the activator and gum arabic as viscosity enhancer and a weak organic acid or salt thereof as a buffering agent; and
   the electroless metal-plating solutions of (b) and (d) consist of an acidic aqueous solution containing nickel chloride and sodium hypophosphite.